United States Patent
Ross et al.

(10) Patent No.: US 9,524,421 B2
(45) Date of Patent: Dec. 20, 2016

(54) DIFFERENTIATING REAL FACES FROM REPRESENTATIONS

(71) Applicant: Google Inc., Mountain View, CA (US)

(72) Inventors: Steven James Ross, Allison Park, PA (US); Brian Patrick Williams, Mountain View, CA (US); Henry Will Schneiderman, Pittsburgh, PA (US); Michael Christian Nechyba, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 14/100,704

(22) Filed: Dec. 9, 2013

(65) Prior Publication Data

US 2015/0161434 A1    Jun. 11, 2015

(51) Int. Cl.
*G01C 3/08* (2006.01)
*G06K 9/00* (2006.01)
*G06F 21/32* (2013.01)

(52) U.S. Cl.
CPC ........... *G06K 9/00288* (2013.01); *G06F 21/32* (2013.01); *G06K 9/00268* (2013.01)

(58) Field of Classification Search
CPC .. G06K 9/00288; G06K 9/00268; G06F 21/32
See application file for complete search history.

(56) References Cited

U.S. PATENT DOCUMENTS

| | | | |
|---|---|---|---|
| 8,396,265 B1 * | 3/2013 | Ross et al. | 382/118 |
| 8,406,484 B2 | 3/2013 | Yoon et al. | |
| 8,411,909 B1 | 4/2013 | Zhao et al. | |
| 8,442,355 B2 | 5/2013 | Imai | |
| 8,457,367 B1 | 6/2013 | Sipe et al. | |
| 2002/0185618 A1 * | 12/2002 | Ohishi et al. | 250/559.38 |
| 2009/0185723 A1 * | 7/2009 | Kurtz et al. | 382/118 |
| 2011/0164792 A1 * | 7/2011 | Yoon et al. | 382/118 |
| 2015/0015688 A1 * | 1/2015 | Yang | 348/77 |

* cited by examiner

*Primary Examiner* — Luke Ratcliffe
*Assistant Examiner* — Samantha K Abraham
(74) *Attorney, Agent, or Firm* — Morris & Kamlay LLP

(57) ABSTRACT

Facial recognition can be used to determine whether or not a user has access privileges to a device such as a smartphone. It may be possible to spoof an authenticated user's image using a picture of the user. Implementations disclosed herein utilize time of flight and/or reflectivity measurements of an authenticated user to compare to such values obtained for an image of an object. If the time of flight distance and/or reflectivity distance for the object match a measured distance, then the person (i.e., object) may be granted access to the device.

14 Claims, 5 Drawing Sheets

DIFFERENTIATING REAL FACES FROM REPRESENTATIONS

BACKGROUND

Facial recognition may be utilized as a security feature for an electronic device connected to or equipped with a camera. For example, a user may be asked to submit a face capture during the initial setup of a device. During the setup or enrollment procedure, the user's face may be captured and stored as an authorized user image. A facial recognition analysis may be performed on the captured image to designate features of the user's face and/or determine a computer model of the user's face (or derivatives thereof). Subsequently, if an individual seeks access to the device, a picture of the individual may be captured, analyzed, and compared to the stored authorized user's image (and corresponding analysis) to determine if the individual matches that image. In the event insufficient correlation exists between the image from the individual attempting to access the device and the authorized user's image, access to the device may be denied.

Despite the above verification method, an unauthorized user may attempt to use a spoofing method to gain access to the device, such as using a printed pictured of the authorized user. One method to detect a picture may use a proximity sensor (e.g., laser range finder, infrared proximity technology, photometric technology, radar, sonar, etc.) may measure the distance between a computing device and an object external to the device (e.g., a user or picture of the user). The proximity information may be used to determine an expected number of pixels between two features on a captured image (e.g., distance between pupils). A user may be denied access to the device if the number of pixels in an access request capture picture exceeds a threshold value that is expected based on the distance to the object and the authorized image.

BRIEF SUMMARY

According to an implementation of the disclosed subject matter, a profile of a first face of a user authorized to operate the device may be obtained by the device in some configurations. Light may be emitted from a device toward an object, for example, for a predetermined time interval. An image of an object may be captured using a sensor that may receive light by a sensor. A time of flight distance for the light may be determined over at least a portion of the object in some configurations. A reflectivity distance may be determined based on the amount of light received by the sensor during the portion of the predetermined time interval. The reflectivity distance may be compared to a measured distance to the object. It may be determined whether or not the object is authorized to operate the device based on the comparison. An access level to the device may be provided based on the determination of whether or the object is authorized to operate the device or not.

In an implementation, a device is provided that includes a processor that may be configured to obtain a profile of a first face of a user authorized to operate the device. It may determine a time of flight for the light over at least a portion of the object and a reflectivity distance based on an amount of light received by the sensor. The processor may be configured to compare the reflectivity distance to a measured to the object from the device. It may determine whether the object is authorized to operate the device based on the comparison of the reflectivity distance to the measured distance. The processor may be configured to provide an access level to the device based on the determination of whether the object is authorized to operate the device. The device may include an image capture device that includes at least one light emission module and at least one sensor. The one or more light emission modules may be configured to emit light from the device toward an object. The one or more sensors may be configured to capture an image of the object by receiving at least a portion of the light emitted by the light emission module.

Implementations of the disclosed subject matter may allow facial detection systems to be more secure than conventional system based upon measuring the time of flight of light reflected off an object and determining reflectivity of an object. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Disclosed is an anti-spoofing technology that incorporates a light emitting source. The light may reflect off an external object and return to the device where it may be captured (e.g., by a photometric sensor) and analyzed for the time of flight of the light and reflectivity. In some configurations, the measurements for time of flight and/or reflectivity may complement a distance detected based on landmarks of a person's face. Distance measurements may be obtained for an object based on one or more of reflectivity, time of flight, and between two or more landmarks. For example, facial recognition may be used to determine that the object appears similar to the authorized user; however, one or more distance measurements based on reflectivity, time of flight, and/or two or more landmarks may not match within a confidence interval (e.g., the distance based on reflectivity may be significantly different from the time of flight distance). In such an event, the object may be denied a level of access to the device. If, however, the distance measurements of the object match within a confidence interval, the object may be granted a level of access to a device.

The time of flight data may indicate a distance (referred to herein as a time of flight distance) and/or three-dimensional map of the external object. For example, a picture may exist in a particular plane. If the picture were entirely parallel to a camera or photometric, the reflected light would have an almost identical time of flight regardless of which portion of the picture the light reflected from. If, however, a person's face was the external object, the time of flight for light returning from the person's nose may be shorter than that returning from the person's ears; accordingly, a distance measurement based on the time of flight data would indicate that the person's nose is closer to the device than the person's ears. Reflectivity may refer to the amount of light that returns to a sensor compared to the amount emitted. For example, a glossy picture of a user's face would have relatively high reflectivity in comparison to the actual user's face. A distance measurement may be obtained based on reflectivity (referred to herein as a reflectivity distance). Thus, by utilizing the time of flight and reflectivity, a particular metric may be generated corresponding to a user's face and that metric may differ from a spoofing method such as using a printed picture of the user. For example, the metric may be a distance measurement corresponding to each of time of flight and reflectivity and an object whose distance measurements fall outside a predefined range of distance values may not be allowed to access the device or may have very limited access to the device (such as the ability to make an emergency phone call).

Figure 5:
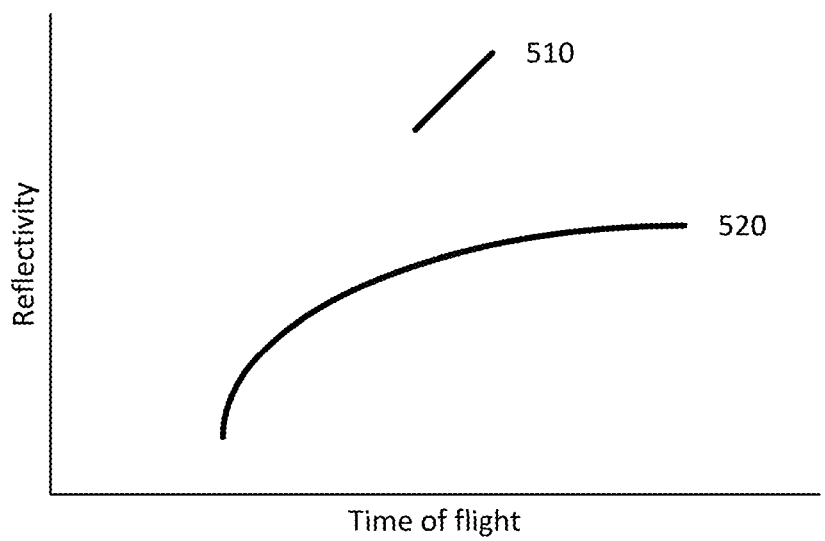
FIG. 5 is an example plot of reflectivity versus time of flight for a picture and a user's face.

As stated above, an example of a metric may be a distance determined from reflectivity and/or a distance determined from time of flight data. An example of the metric may be a plot of reflectivity versus time of flight data. In FIG. 5, two lines are shown, each of which may represent a regression of time of flight data and reflectivity data obtained from a picture held in front of a camera 510 and an actual user's face 520. A picture of the user held in front of a camera would have a very narrow pattern due to the uniformity of the paper. That is, the paper on which the picture is printed would be relatively uniform over its entire length as compared to that of a user's face. Similarly, the time of flight data for a piece of paper would likely occupy a narrow range as compared to that a of a user's face. A sheet of paper containing a picture of the user would occupy a plane whereas the three dimensional nature of a user's face would cause a more dispersed time of flight for light. In some configurations, the pattern or regression for an authorized user's face may be compared to that obtained for an object to determine whether the object is authorized to use the device (i.e., have a level of access to the device). Reflectivity data, time of flight data, and distance between landmarks may be determined for a user authorized to operate a device and stored to a profile of the user. Similarly, such data may be obtained or measured for the object and stored as a profile of the object.

A proximity sensor may be used to determine a distance between a device and an external object. Landmarks of a user, such as a person's eyes, may be determined for an authorized user and for an object. The landmarks, as described below, may be utilized to determine, for example, the number of pixels between a user's eyes. Distance calculations based on reflectivity, time of flight, and two or more landmarks may complement other methods to determine whether the object is authorized to access the device (e.g., facial recognition). For example, a life size picture of or computer display with an image of an authorized user may have time of flight and landmark distances that are sufficiently similar to one another. However, if the reflectivity distance or the metric as disclosed herein sufficiently diverges from the distance calculations based on time of flight and/or two or more landmarks, then the spoof attempt may be prevented. That is, the false face would not fool the device into thinking that it is the actual authorized user. The reflectivity data and time of flight data may also be utilized during the setup or enrollment process to assist in generating the authorized user data against which all subsequent image capture data for facial recognition are compared.

Figure 3:
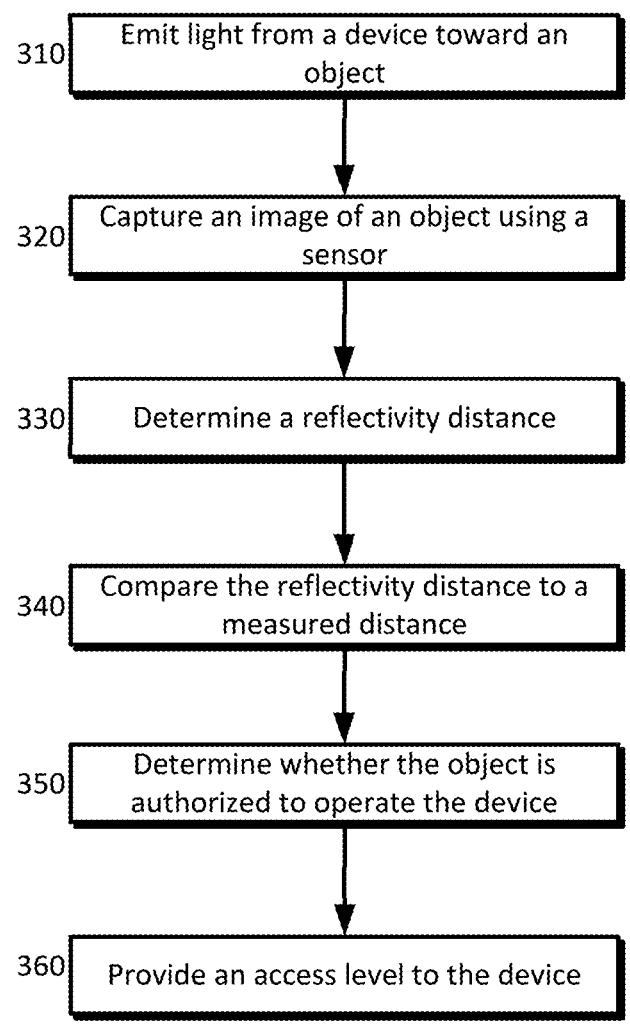
FIG. 3 is an example method for utilizing time of flight and/or reflectivity to ascertain whether or not a user is authorized to operate a device as disclosed herein.

In an implementation, an example of which is provided in FIG. 3, a profile of a first face may be obtained. For example, a profile of the first face may be generated during an enrollment process or phase. An enrollment phase may refer to when a user first associates the user's identity (e.g., user name, email, other accounts such as cloud storage, credit card, user name, password, etc.) with a device. The first face may correspond to a user authorized to operate the device. The profile may refer to one or more images corresponding to a face of an authorized user and/or a mathematical representation of the face of a user authorized to operate the device. Representations of the first face may be used subsequently as a component of facial recognition algorithms. The profile may include, for example, reflectivity data, time of flight data, and/or landmarks of the first face of a user authorized to operate the device. Reflectivity and/or time of flight data associated with the first face may be expressed as a range of values and/or in terms of a distance measurement. The profile may include measurements related to identified areas (e.g., landmarks) of the user's face, such as the distance between the user's eyes. Facial recognition software may store other features necessary to uniquely identify the user's face to the profile such as a color intensity, a histogram of gradients, or a template as described below. The profile may include time of flight data for identified features of the user's face for example.

In some configurations, more than one user may be authorized to operate the device. A device with multiple users may have different levels of access for different users. For example, some users may have full access to the device's functions (e.g., read, write, or delete), programs or applications, or data. Other users may have limited access. For example, a user may be allowed to access only a subset of programs or hardware (e.g., a user can use the camera but not the Wi-Fi antenna). Thus, for any implementation disclosed herein, more than one user may be authorized to operate a device and the level of access to one or more functions of the device may be customized based on the authorized user.

A device, such as a smartphone or tablet, may emit light from a device toward an object at 310. For example, a light emitting diode or an infrared light source on the device may emit light for a predetermined time interval. A predetermined time interval may refer to an exposure time and may vary based on the type of sensor that collects the light or that is incorporated into a camera used to capture an image of an object within the camera's field of view. An object may refer to anything within a sensor's detection capabilities (e.g., a face and/or surrounding environment). An image of the object may be captured using a sensor at 320. For example, a sensor may receive a portion of the light emitted at 310 during at least a portion of the predetermined interval. The sensor may not collect all of the light emitted during the predetermined interval or it may collect light for only a portion of the predetermined interval. In some configurations, multiple light sensors may be employed to capture more light.

A time of flight distance for the light may be determined over at least a portion of the object. A time of flight may represent the time interval from when the light source transmits the light to when the sensor receives the reflection from the object. Typically the time of flight value will be directly proportional to the distance between the object and the sensor. A time of flight distance for the object may be computed based on the time of flight. For example the average time of flight for a face detected within the image of the object may be computed and converted to a distance measurement.

A reflectivity distance may be determined based on an amount of light received by the sensor at 330. Reflectivity may refer to the fraction of the power of emitted light that is reflected at an interface. A distance between a portion or the entire object may be determined based on the reflectivity data and may be referred to as a reflectivity distance.

The time of flight distance and/or reflectivity distance may be compared to a measured distance to the object from the device at 340. The measured distance may refer to a distance between the object and the device. It may be generated in a number of ways. For example at least two landmarks may be identified within the image of the object. A number of pixels in the image disposed between the at least two landmarks within the image of the object (e.g., the object may contain a second face with two landmarks) may be determined. The measured distance may be determined based on the number of pixels in the image disposed between the at least two landmarks. That is, the number of pixels between the landmarks may allow a distance to be extrapolated as between the object and the sensor of the device.

As another example, the measured distance may be calculated as the time of flight distance to the object, as disclose elsewhere herein. Most generally, a time of flight distance may be calculated by measuring the amount of time required for light emitted by a device to reflect off an object and be received by the device. Because the speed of light is constant, the time of flight of the light provides a relatively accurate measurement of the distance to the object. The time of flight distance also may be an average or other combination of distances to various parts of an object as disclosed elsewhere herein.

A determination may be made as to whether the object is authorized to operate the device based on the comparison of the time of flight distance, reflectivity distance, and/or a distance based on landmarks of the object, to a measured distance at 350. An access level to the device may be provided based on the determination of whether the object is authorized to operate the device at 360. The device may be placed into a locked state if the object is determined to be unauthorized to operate the device. That is, the reflectivity distance and/or time of flight distance may not match within a confidence interval to the measured distance. For example, landmarks in the image of the object may indicate that the distance between the sensor and the object is 0.5 m. However, the reflectivity distance may indicate that the object is 0.25 m away from the sensor. The two distances do not match within a confidence interval and, therefore, the object may be denied access to the device. A time of flight distance measurement may also be utilized to improve the precision of the authentication. In some configurations, the time of flight distance may be used as the base measured distance, and the reflectivity distance and/or landmark distance compared to each other and/or to the time of flight distance to determine whether the various distances are within a confidence interval of each other.

Some of the representations or measurements obtained from the first face may include reflectivity data and time of flight data as stated earlier. The profile for the first face may establish minimum and maximum thresholds for one or both of the reflectivity of the object and the time of flight determined for the object. The thresholds may be represented as distance measurements within which, an object may be allowed a level of access to the device.

In some configurations, a profile for the object may be generated. The object profile may include a mathematical representation of the object, reflectivity data, time of flight data, and/or landmarks identified in the object, similar to the profile obtained of a user authorized to operate a device. In some instances, facial recognition algorithms may be applied to the image captured by the device and may identify a second face in the image of the object (e.g., a face of a user other than the authorized user). A first face profile may be obtained as described earlier. The profile of the object may be compared to the profile of the first face of a user authorized to operate the device. A comparison of the object profile to the first face profile may be an initial test to determine whether or not a user is authorized to operate a device. A picture of the first face may be sufficient to fool the device into thinking that the actual user is attempting to gain access to the device. The measured distance may be determined and compared to the reflectivity distance and/or time of flight distance. The comparison at this stage may indicate a discrepancy caused by the use of a picture of the first face instead of the actual user to whom the first face belongs. Thus, the object may be denied access to the device.

In some configurations, the time of flight data may be plotted against the reflectivity for both the object and the first face (see, for example, FIG. 5). Use of a picture, for example, that contains an image of an authorized user to gain access to the device would have a distinct profile compared to that of the first face. For example, a time of flight for light reflected from a picture would be relatively uniform depending on the angle at which the picture is oriented relative toward to the light sensor. In contrast, the time of flight for light reflected from a person's face would have a distinct profile. For example, light reflected from a person's nose would have a lower time of flight compared to light reflected from a person's ears. The reflectivity of a piece of paper containing an image of an authorized user may absorb and scatter and/or reflect light in a manner that is different from that of the user's actual face. For example, the reflectivity for one, some, or all particular points on the sheet of paper may be the same as, or within a relatively small range of that of one or more other points on the sheet of paper. In contrast, the reflectivity of a person's face may vary from one point to the next. Plotting the reflectivity versus the time of flight in the example of a sheet of paper containing an image of the first face may reveal a narrowly defined pattern whereas a person's face may have a more distributed appearance in the plot.

In some instances, the object may be a face that does not correspond to the first face (i.e., a second face). For example, a user who is not an authorized user of the device may attempt to gain access to the device. The second face may be identified or detected by the sensor and a processor connected thereto using facial recognition. A sensor may utilize one or more sensing technologies such as capacitive displacement, laser rangefinder technology, magnetic sensing technology, infrared proximity sensing technology, photometric (or reflective) technology, radar, ionizing, and sonar sensor technology. As stated earlier, the device may utilize one or more sensors.

The device may be configured to operate in a "locked" mode. In some examples, a user may actively configure computing device to operate in locked mode. For example, a user may press a button for a predetermined length of time to request computing device to operate in locked mode. In these and other examples, a user may tap, swipe, or otherwise interact with one or more elements of a user interface using an input/output capable display. The device may also be configured to operate in locked mode by passive means. For example, a predetermined period of inactivity may configure computing device to operate in locked mode. Inactivity may occur due to an absence of user interaction (e.g., through button presses, contact with an input/output capable display device, etc.). The predetermined time period that configures device to operate in locked mode may be a default time period specified by a manufacturer of the device or may be programmed by an authorized user.

In some examples, the device may utilize facial recognition technology to stop operation in locked mode. In other words, authorized user may unlock the device by authentication methods that use facial recognition techniques to determine whether a user is an authorized user of the device or not. More specifically, an authorized user may set up a facial recognition application or embedded process of the device by storing an enrollment image or template that represents the face of authorized user as stated earlier. The authorized user may cause a camera of computing device to capture the authentication using camera lens. The device may store the enrollment image or template to one or more storage devices of the device, and/or to a remote location, commonly known as "cloud storage." As used herein, a template may represent various mathematical expressions of a facial image. For example, a template may include values and value transitions associated with brightness, tone, contrast, and other image-based metrics. In some instances, a template may include vector quantizations associated with a facial image. For example, such a template may express pixel transitions (or "spatial frequencies") on a facial image as wavelets, and derive wavelet coefficients among two or more of the wavelets. The wavelet coefficients may represent all or a portion of the facial image. While techniques of this disclosure may be performed using one or both of enrollment images and templates, for purposes of example, the techniques are described mainly with respect to enrollment images.

To unlock the device using facial recognition technology, a user (such as authorized user) may provide an authentication image that represents at least a portion of his/her face. In some examples, the user may actively cause a camera of the device to capture the authentication image. The device may then compare the captured authentication image with the enrollment image, and determine whether or not the images are sufficiently similar to each other for facial recognition purposes. For example, the device may utilize one or more facial recognition programs to compare metrics associated with the authentication image to metrics associated with the enrollment image. Some examples of metrics may include distances between facial elements (pupil-to-pupil, mouth width, etc.), contours of various facial features, pixilation corresponding to skin tone or texture, hair and/or eye color, and many others. Facial recognition programs running on computing device may perform the comparison using one or more well-known recognition algorithms, such as geometric and/or photometric approaches, three-dimensional (3D) modeling and recognition techniques, principal component analysis using Eigenfaces, linear discriminate analysis, elastic bunch graph matching, pattern matching, and dynamic link matching, to name just a few. Based on comparison-based values, such as pre-programmed acceptable margins of error, facial recognition programs running on the device may determine whether or not the authentication image and the enrollment image are sufficiently similar to one another for facial recognition. In instances where the facial recognition programs grant a match, the user may successfully unlock the device. Conversely, if the facial recognition programs deny a match, the user may be unable to unlock the device and the device may continue to operate in locked mode.

Figure 6:
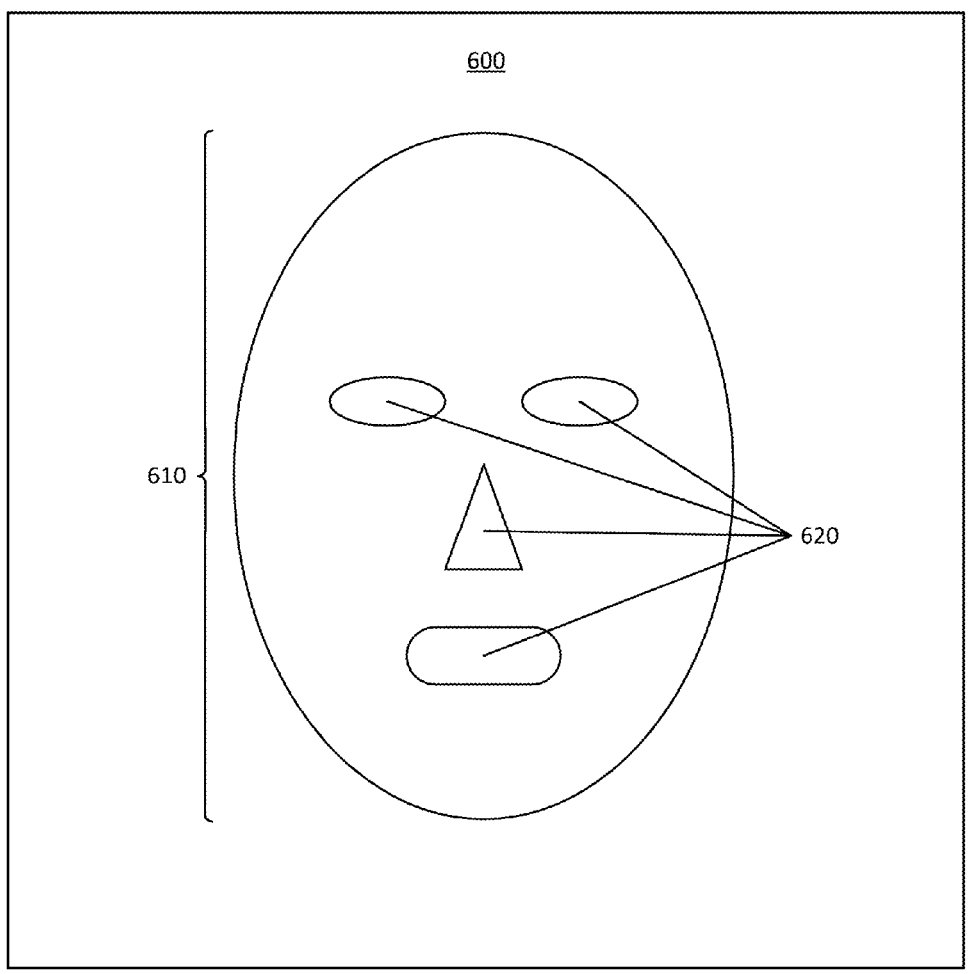
FIG. 6 is an example image of an object according to an implementation of this disclosure.

In some implementations, the device may utilize a proximity sensor to determine a physical distance between the device and the object. The device may determine the distance by capturing an authentication image of the object and then compute the number of pixels between two or more landmarks within the image. For example, according to an implementation of the disclosure, FIG. 6 shows image 600, depicting object 610, which may be a face having landmarks 620. The device may identify areas of the image that are associated with the eyes of the authorized user as landmarks. The greater the number of pixels between the eyes, the closer the object maybe positioned to the device such as where a person has positioned a picture of a user in front of a camera in an attempt to spoof an authorized user's face. The device may compare the distance between the object and the device to an expected distance, and reject the unlock attempt if the detected distance and the expected distance do not match. For example, when the device detects that the number of pixels between the eyes exceeds a preprogrammed threshold (e.g., 10 centimeters), the device may identify this as an attempt to "fool" the facial recognition programs running on the device by obtaining access to the device based upon an image of an authorized user's face instead of the user's actual face.

The device may determine whether the object of an authentication image is within a threshold proximity by using one or more sensors. As discussed, a sensor may implement one or more sensing technologies to determine the distance between computing device and the object of an authentication image captured by the device. The device may then compare the measured distance to the threshold, and deny authentication by facial recognition if the measured distance is less than the threshold. For example, the device may discern the distance between the device and the object by analyzing certain qualities of the image of the object. A captured image of the object may include a visual representation of the authorized user. In this example, the device may identify two or more landmarks within image and determine a number of pixels between the landmarks. For example, the device may identify a left cornea and a right cornea in the captured image of the object as landmarks and determine the number of pixels disposed between the left and right corneas. The higher the number of pixels, the closer that the device may determine the object is to the device. If the number of pixels between the left and right corneas is greater than a threshold pixel count, the device may deny authentication by facial recognition and display failure notification.

Figure 4:
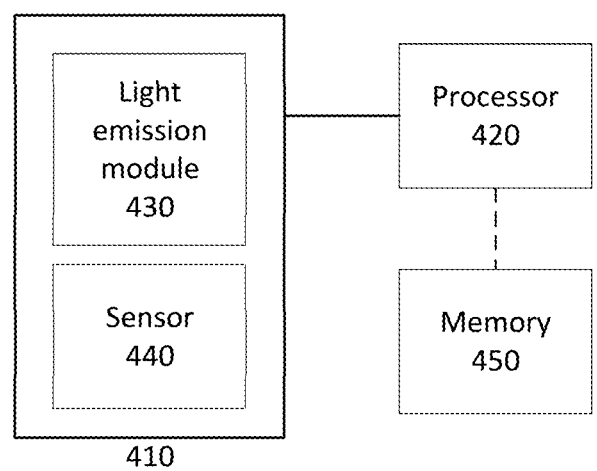
FIG. 4 is an example device that can measure reflectivity and/or time of flight of an image of an object according to an implementation.

In an implementation, a device is provided that includes an image capture device 410 and a processor 420 connected thereto as shown in the example provided in FIG. 4. The device may include other components that are not shown here such as a power supply, storage device, GPS receiver, etc. The image capture device 410 may include at least one light emission module 430 and at least one sensor 440. The light emission module 430 may correspond to a light source that emits light at a wavelength between 10 nm to 1 mm, or within the ultraviolet to infrared wavelength ranges in the electromagnetic spectrum. The light emission module 430 may be configured to emit light for a predetermined interval. One or more sensors 440 (such as a front facing camera, see examples provided earlier) may be configured to capture an image of the object by receiving at least a portion of the light emitted by the light emission module 430, for example, during at least a portion of the predetermined interval.

The device may also include one or more input and/or output device. One or more input devices may be configured to receive input from a user through tactile, audio, video, or biometric channels. Examples of input devices may include a keyboard, mouse, touchscreen, presence-sensitive display, microphone, one or more still and/or video cameras, fingerprint reader, retina scanner, or any other device capable of detecting an input from a user or other source, and relaying the input to computing device, or components thereof. One or both a front-facing camera and sensors may, in some instances, be part of input devices. Output devices may be configured to provide output to a user through visual, auditory, or tactile channels. Output devices may include a video graphics adapter card, a liquid crystal display monitor, a light emitting diode monitor, a cathode ray tube monitor, a sound card, a speaker, or any other device capable of generating output that may be intelligible to a user. Output devices may also refer to a touchscreen, presence-sensitive display, or other input/output-capable displays known in the art.

The processor 420 may be connected to the image capture device 410. It may be configured to obtain a profile of a first face of a user authorized to operate the device as previously disclosed herein. It may determine a time of flight for the light over at least a portion of the object and/or a reflectivity distance based on an amount of light received by the sensor during the portion of the predetermined time interval. Values obtained for time of flight, reflectivity, and/or the image of an authorized user may be stored in temporary or permanent memory that is connected to the device. The processor 410 may compare a time of flight distance and/or the reflectivity distance of the object to a measured distance from the device, as described earlier. It may determine whether the object is authorized to operate the device based on the comparison of the time of flight distance and/or reflectivity distance of the object to the measured distance. In some configurations, a distance based on the time of flight may be utilized as the measured distance and the reflectivity distance may be compared to the time of flight distance. As stated above, a representation of an authorized user may be stored to memory 450. The representation of the authorized user may be compared to the image of the object captured by a sensor such as a front facing camera. The processor 410 may be configured to provide an access level to the device based on the determination of whether the object is authorized to operate the device. For example, if the reflectivity and/or time of flight data for the image of the object are within a range similar to that obtained from the image of the authorized user, then access to the device may be granted as previously disclosed herein. A reflectivity distance and/or time of flight distance may be compared to a measured distance such as an extrapolated distance based on the number of pixels between two landmarks of the object. If the object profile and each of the distance measurements match within a confidence interval, the object may be deemed to be authorized to access the device.

Figure 1:
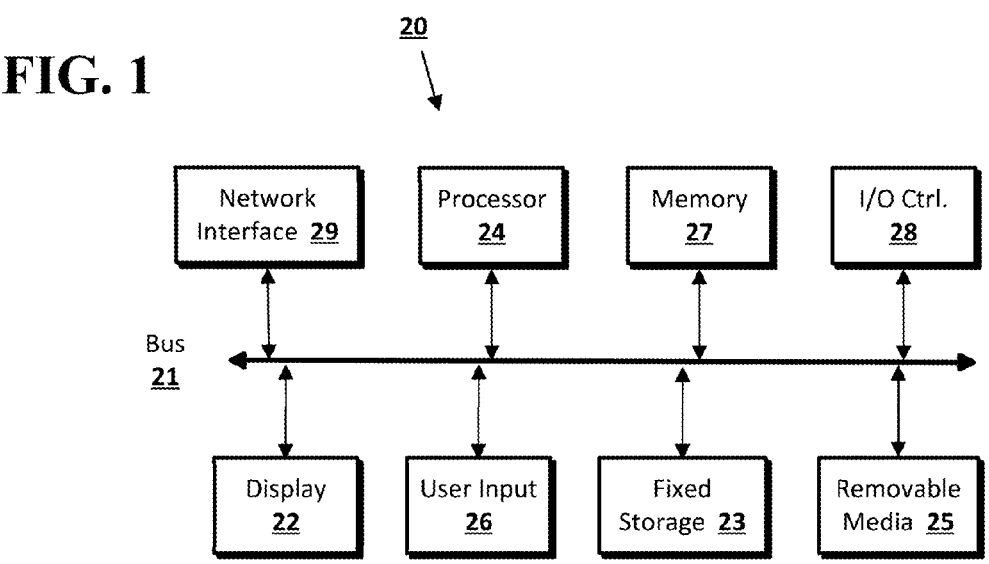
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
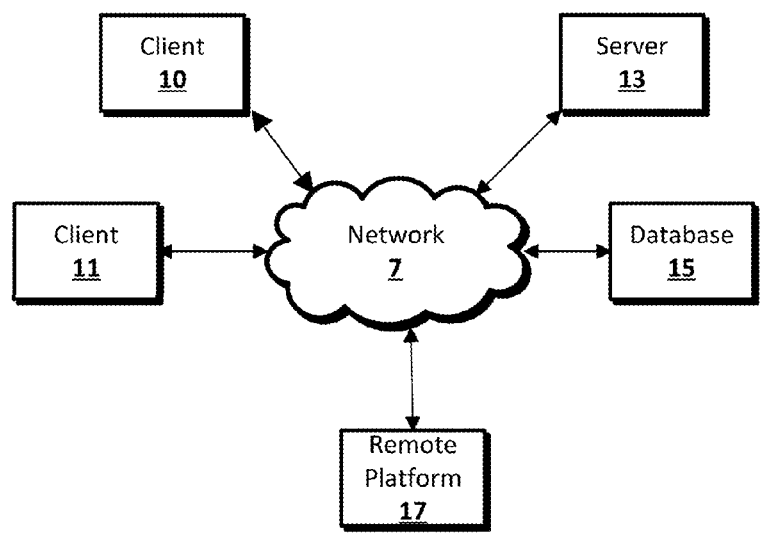
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
   emitting light from a device toward an object;
   capturing an image of the object using a sensor, comprising receiving the light by the sensor;
   identifying at least two landmarks within the image of the object;
   determining a number of pixels in the image disposed between the at least two landmarks;
   determining a measured distance between the device and the object based on the number of pixels;
   determining a reflectivity distance between the device and the object based on an amount of light received by the sensor;
   determining a time of flight distance between the device and the object;
   comparing the time of flight distance, the reflectivity distance, and the measured distance;
   determining whether the object is authorized to operate the device based on the comparison of the time of flight distance, the reflectivity distance, and the measured distance; and
   providing an access level to the device based on the determination of whether the object is authorized to operate the device.

2. The method of claim 1, wherein the access level to the device comprises a locked state if the object is determined to be unauthorized to operate the device.

3. The method of claim 1, wherein the light is emitted for a predetermined interval.

4. The method of claim 1, further comprising:
   obtaining a profile for a first face of a user authorized to operate the device; and
   generating a profile for the object.

5. The method of claim 4, wherein the determination of whether the object is authorized to operate the device is further based on a comparison of the profile for the first face and the profile for the object.

6. The method of claim 5, wherein the level of access provided to the device is further based on the comparison of the profile for the first face and the profile for the object.

7. The method of claim 1, wherein the determination of the time of flight distance is based on a time interval from when the light was emitted from the device and when the sensor received the light.

8. A device, comprising:
   an image capture device comprising at least one light emission module and at least one sensor;
      wherein the at least one light emission module is configured to emit light from the device toward an object;
      wherein the at least one sensor is configured to capture an image of the object by receiving at least a portion of the light emitted by the light emission module; and
   a processor configured to:
      determine a reflectivity distance between the device and the object based on an amount of light received by a sensor;
      determine a time of flight distance between the device and the object;
      identify at least two landmarks within an image of the object;
      determine a number of pixels in the image disposed between the at least two landmarks;
      determine a measured distance between the device and the object based on the number of pixels;

compare the reflectivity distance, the time of flight distance, and the measured distance;

determine whether the object is authorized to operate the device based on the comparison of the reflectivity distance, the time of flight distance, and the measured distance; and provide an access level to the device based on the determination of whether the object is authorized to operate the device.

9. The device of claim 8, wherein the access level to the device comprises a locked state if the object is determined to be unauthorized to operate the device.

10. The device of claim 8, wherein the light is emitted for a predetermined interval.

11. The device of claim 8, the processor further configured to:

obtain, by the device, a profile for a first face of a user authorized to operate the device; and generate a profile for the object.

12. The device of claim 11, wherein the determination of whether the object is authorized to operate the device is further based on a comparison of the profile for the first face and the profile for the object.

13. The device of claim 12, wherein the level of access provided to the device is further based on the comparison of the profile for the first face and the profile for the object.

14. A method, comprising:

emitting, by a device, light toward a plurality of locations on an object;

capturing, by the device, the light reflected from the plurality of locations on the object;

determining, by the device, a first time of flight from when the light was emitted from the device, reflected from a first location of the plurality of locations, and captured by the device;

determining, by the device, a second time of flight from when the light was emitted from the device, reflected from a second location of the plurality of locations, and captured by the device;

comparing, by the device, the first time of flight to a first corresponding time of flight associated with a profile of an authorized user of the device;

comparing, by the device, the second time of flight to a second corresponding time of flight associated with the profile of the authorized user of the device;

determining, by the device, a level of access to the device based on the comparison of the first time of flight to the first corresponding time of flight and the comparison of the second time of flight to the second corresponding time of flight; and providing, by the device, the level of access to the device.

* * * * *